United States Patent Office 3,096,425
Patented July 2, 1963

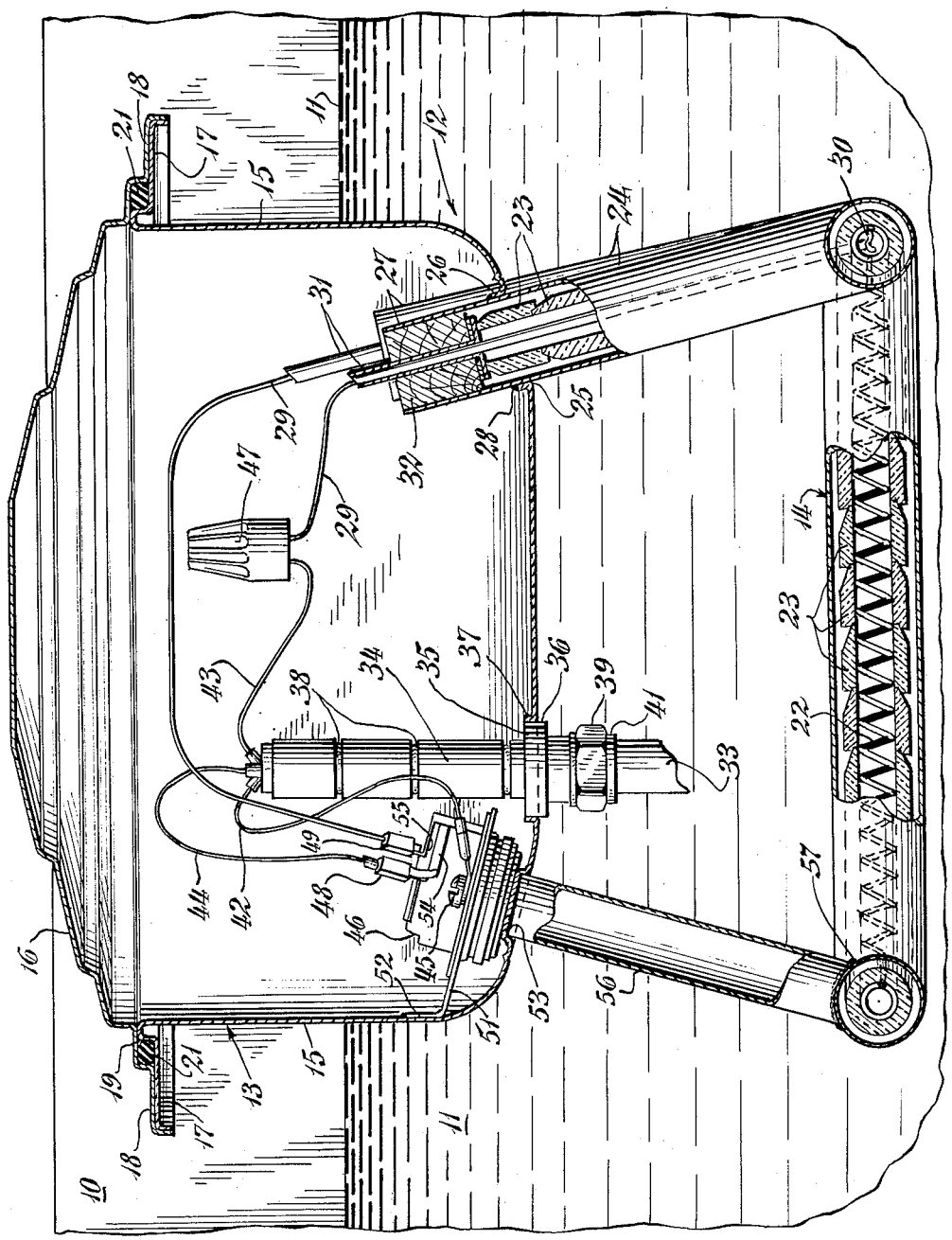

3,096,425
FLOATING ELECTRIC HEATER FOR STOCK
WATERING TANK
Maurice H. Keating and John J. Kubinski, Rockford, Ill., assignors to H. D. Hudson Manufacturing Company, Chicago, Ill., a corporation of Minnesota
Filed Jan. 12, 1961, Ser. No. 82,195
2 Claims. (Cl. 219—38)

The present invention relates to an electric heater for a stock watering tank and more particularly to a new and improved floating type electric heater.

A stock watering tank exposed to the elements must have provision for preventing freezing of the drinking water in cold weather so that the stock can obtain the necessary water supply at the proper drinking temperature to obtain the maximum benefit. If the water is too cold, the milk production of cows will drop substantially since the cows will not consume the quantity of such water necessary for maximum milk production. Also, cattle and other livestock raised for meat will not show the proper weight gain if the drinking water is too cold for, in that event, they will drink but a fraction of what should be their normal daily consumption.

When water is at the proper temperature for drinking, a cow may consume approximately 18 gallons per day. Should the water be too cold, it may consume a maximum of 6 to 9 gallons, thus substantially reducing its milk production. Heating the drinking water for the stock to approximately 45–48° F. usually provides a proper drinking temperature in cold weather. To keep the water within this desired temperature range in freezing or near freezing weather, the novel floating heating unit is placed within the watering tank with its heating element submerged in the water and its float provided with a thermostatic control to maintain the drinking water at the proper temperature substantially above freezing. Such a unit to be most effective must not cause the stock to shy away from it or present any danger thereto, and it must be sufficiently stable so that the stock cannot tip it over.

One problem which has been present in previous heaters is the continued operation of the heater where little or no water is present in the tank and the temperature is sufficiently low to actuate its thermostatic control. In temperatures of approximately 40° F., if the water level in the tank becomes low so that the heater is out of the water or exposed to the cold atmosphere, the thermostatic switch will be actuated by the cold ambient temperature with the result that the electric resistance or heating element will become overheated and subjected to damage necessitating costly repairs or replacement. To remedy this problem, the present invention has a novel safety means embodied therein whereby in such event the thermostatic switch opens automatically and prevents the resistance or heating element from being damaged due to overheating.

It is, therefore, an important object of the present invention to provide a novel electric tank heater which normally floats in a stock watering tank with its heating element submerged, and having means for preventing overheating and damage to the heating element in the event this heating element is out of the water and exposed to a temperature sufficiently low to close the thermostatic switch for controlling the flow of current for energizing the heating element.

While the thermostatic control is actuated by the cold ambient air when the temperature of the air is sufficiently low to energize the thermostatic switch, the latter is so arranged that heat from the heating member is rapidly conducted through a tube to a sensitive portion of the thermostat switch causing the latter to open rapidly and positively before any serious overheating of the heating element can occur.

A further important object of the present invention is the provision in a float type electric tank heater of a novel thermostatic switch within the float and so arranged as to be responsive in a novel manner to changes in the ambient temperature so that if the resistance or heating element begins to overheat due to lack of water in the tank, this increase in temperature is quickly transmitted to the thermostatic switch and automatically cuts off the current supply before any damage may occur to the heater element.

Another object of the present invention is the provision in a float type electric tank heater of a hollow tube between the heating element and the float for rapidly conducting heat from the heating element to a thermostatic control in the float and which tube also serves as a support member or brace for the mounting of the heating element. The thermostatic switch is located directly above the junction of the tube with the bowl of the float and seats on an embossed area in the bowl so that if the heating element tends to overheat, such heat is rapidly conducted through this hollow tube and opens the switch to automatically cut off the current supply.

In this novel embodiment the current supply line is so located and arranged that the stock will not incur shock by contact with the exposed float or by access to the current supply cord. The suspended heating element is so located relative to the float that the water below the surface is most effectively heated to maintain the water in the tank at a proper drinking temperature even in the coldest weather.

Further objects are to provide a construction of maximum simplicity, efficiency, economy and ease of assembly and operation, and such further objects, advantages and capabilities as will later more fully appear and are inherently possessed thereby.

The present invention is an improvement over the electric heater disclosed in the Jacob T. Landgraf Patent No. 2,561,932, issued July 24, 1951.

In the drawing:

The single FIGURE is a view principally in vertical cross section of the novel floating electric heater for heating the water in a stock watering tank.

Referring more particularly to the disclosure in the drawing in which is shown an illustrative embodiment of the present invention of a novel floating type electric heater for a stock watering tank 10 containing a suitable depth of drinking water 11 to be consumed by the stock. Floating in the body of water is an electric heater 12 comprising a float 13 and a heating element 14 depending from the float and suspended approximately three or four inches below the surface of the water.

The float 13 consists of a relatively deep bowl or cup-shaped member 15 and a domed cap or closure 16, each having peripheral outwardly and downwardly extending nesting flanges 17 and 18, respectively. When the bowl and cap are assembled, the flanges 17 and 18 form an annular enclosing space 19 therebetween conformably receiving an annular resilient sealing ring or gasket 21 for effectively sealing the interior of the float. Thus, the float 13 is watertight preventing the entrance of any water in the event the float is tipped by stock while drinking and thereby preventing any danger or damage from any short circuits which might result.

The enclosed heating coil 14 contains a heating element 22 composed of a resistor wire which is formed like a coiled spring and extends through a series of beads or rings 23 of porcelain or other suitable refractory material. The heating coil 14 is formed from a single piece of copper tubing bent to oblong or oval shape, such as shown in FIG. 2 of the above mentioned Landgraf patent, and has upwardly bent leg portions 24 each having an end which projects through an opening 25 in the bottom of the bowl member 15 of the float 13, with the flanged necks 26 being extruded or otherwise formed upwardly to tightly encompass the projecting end portions 27 of the legs 24 and soldered as at 28 to provide an effective seal. The heating coil is in a symmetrical balanced relation to the float 13 so that the coil will always float evenly and return to its normal upright position since the bulk of the weight of the unit is in the coil 14 with its contained heating element 22 and the insulators 23 and, due to its low center of gravity, the unit will right itself automatically.

The electrical heating element 22 extends in the coil 14 only so far as the lower ends of the upwardly bent leg portions 24, where it is connected to low resistance conductors 29 as at 30. The conductors 29 extend from the heating element up through the upwardly bent leg portions 24 and guide tubes 31 and into the interior of the float 13. These conductors 29 are surrounded by insulator beads or rings 23 within the legs 24 projecting from the heating coil 14. Wooden plugs 32 are preferably driven into the projecting ends 27 of the heating coil 14 with each conductor 29 and guide tube 31 extended through a central opening in the plug. Refractory cement or other such appropriate material may be employed as sealants over the tops of plugs 32 and around the conductors 29.

Also extending upwardly into the float 13 through the bottom of the bowl member 15 is a flexible rubber-covered conductor cord 33 for supplying current to the electrical heating element. A watertight connection is assured through the use of an encompassing copper tube 34 and a connector 35 having a flange or enlargement 36 conformably received within an opening defined by an upwardly extruded neck 37 and sealed therein by solder or other sealing means. The tube 34 is compressed around the cord 33 by crimping or rolling beads at spaced intervals as indicated at 38. A tightening nut 39 is adjustably mounted on the threaded lower end 41 of the connector 35 to compress the end of the tube 34 about the cord 33.

It is preferred that three low resistance conductors 42, 43, 44 are housed within the conductor cord 33. One conductor 42 serves as a ground connection, that conductor being grounded at the screw connection 45 of a thermostatic switch 46. A second conductor 43 is directly connected to one of the conductors 29 from the heating coil 14 by a suitable connector 47. The third conductor 44 is connected to one terminal 48 of the switch 46. The other switch terminal 49 is directly connected to the second conductor 29 from the heating coil 14.

The switch 46 is mounted in a spring type bracket 51 secured to the inner side of the bowl member 15 by an arm 52. This bracket 51 provides tension on the switch 46 causing its base to rest upon an embossed area 53 or annular elevation on the bottom of the bowl member 15. The switch 46 will thus be responsive to changes in the ambient temperature inside the float 13, and contains a bimetallic strip 54 which will be distorted in one direction to close the electric circuit by abutting a contact 55. The circuit is opened when the strip distorts in the opposite direction due to a temperature rise. A snap action type member may be used in the switch, if preferred.

A tubular element 56 such as a hollow copper rod or tube is located opposite the upwardly bent leg portions 24 and soldered or otherwise secured to the heating coil 14 as at 57. The opposite end of the element 56 is secured, as by soldering or the like, to the embossed area 53 of the float 13 and thus functions as a brace for the heating coil 14 and, being hollow, also provides for the conduction of heat from the heating coil to the switch, thereby serving as a safety device to prevent the heating element from overheating and being damaged. Normally, the switch 46 is controlled by the ambient air temperature in the bowl member 15. If, for any reason, the heater is out of the water in a temperature cold enough to cause the switch to close and thereby energize the heating element, the heat therefrom is immediately conducted up through the hollow tube or rod 56 to the embossed area 53 above which is mounted the sensitive part of the switch 46. This heat at the embossed area 53 will cause the switch to open, thus preventing overheating of and damage to the heating element 22.

The heater 12 is placed in the tank 10 with the cord 33 depending downwardly into the water from the heater. The cord extends over the edge of the tank 10 and is provided with a conventional three-prong plug or a two-prong plug and a ground line. The plug is inserted into an electric outlet and the ground line, if used, is connected to a metal stake or pipe which is driven into the ground.

Having thus disclosed the invention, we claim:

1. An immersion heater adapted for use in a watering tank for livestock, comprising a tubular heat exchange member in the form of a coil of generally oval shape having upwardly extending end portions, a hollow float disposed above the coil and rigidly connected to said upwardly extending end portions, said float being adapted to suspend said coil beneath the surface of the water to be heated, an electrical resistance element of relatively high resistance within the coil, a thermostatic switch within the float responsive to the ambient temperature in the float, an electrical conductor cord extending through the float and connected to the resistance element through said switch, and safety means communicating with said switch to prevent overheating of the resistance element in the event the coil is exposed to the atmosphere, said safety means including an embossed area on and within the bottom of the float, a spring bracket mounting and urging said thermostatic switch against said embossed area and a hollow heat conducting tube secured to and extending between said embossed area and the coil for conducting heat from said coil to said embossed area and to said switch to open the latter and prevent overheating of the coil.

2. A float type immersion heater for heating the water in a stock watering tank, comprising a hollow member providing a float, a heating element suspended from said float to a position where said element is submerged and maintained beneath the surface of the water in the tank in a substantially horizontal plane, said heating coil having leg portions entering the bottom of the float at one side thereof, an elevated part within and disposed on the bottom of the float, and a thermostatic switch within said hollow float and positioned upon said elevated part in spaced relation at the other side of said float, a spring bracket having a leg affixed to the inner wall of the float with said bracket mounting and urging said thermostatic switch against the elevated part on the float, an electric conductive cord extending into the float through the bottom thereof and connected to the heating element and the switch, the opening and closing of said switch being responsive to the ambient temperature in said float to heat the water in the tank to a predetermined value, and safety means for automatically and quickly opening said switch when the heating element overheats due to lack of water in the tank, including a hollow copper tube providing a supporting brace between the float and the heating element, one of which ends communicates with and conducts heat from the heating element through the hollow tube and the other end communicates directly with said elevated part at the base of the switch to actuate said switch to open position when said heating coil overheats due to lack of water in the tank.

References Cited in the file of this patent

UNITED STATES PATENTS

| | | |
|---|---|---|
| 2,561,932 | Landgraf | July 24, 1951 |
| 2,575,150 | Wellman | Nov. 13, 1951 |
| 2,767,925 | Arnold | Oct. 23, 1956 |
| 2,802,921 | Miklas | Aug. 13, 1957 |
| 2,977,454 | Volker | Mar. 28, 1961 |